(12) United States Patent
Mitchell

(10) Patent No.: US 12,285,707 B2
(45) Date of Patent: Apr. 29, 2025

(54) LIQUID SOLID SEPARATOR WASH WATER SUPPLY SYSTEM

(71) Applicant: John Christopher Mitchell, League City, TX (US)

(72) Inventor: John Christopher Mitchell, League City, TX (US)

( * ) Notice: Subject to any disclaimer, the term of this patent is extended or adjusted under 35 U.S.C. 154(b) by 628 days.

(21) Appl. No.: 17/535,935

(22) Filed: Nov. 26, 2021

(65) Prior Publication Data

US 2022/0080338 A1 Mar. 17, 2022

Related U.S. Application Data

(63) Continuation-in-part of application No. 14/470,794, filed on Aug. 27, 2014, now Pat. No. 11,213,772.

(51) Int. Cl.
| | | |
|---|---|---|
| *B01D 33/48* | (2006.01) | |
| *B01D 33/04* | (2006.01) | |
| *B01D 33/70* | (2006.01) | |

(52) U.S. Cl.
CPC ............. *B01D 33/48* (2013.01); *B01D 33/04* (2013.01); *B01D 33/705* (2013.01)

(58) Field of Classification Search
None
See application file for complete search history.

(56) References Cited

U.S. PATENT DOCUMENTS

| | | | | | |
|---|---|---|---|---|---|
| 2,885,080 | A | * | 5/1959 | Myron | B08B 3/14 210/411 |
| 4,042,507 | A | * | 8/1977 | Langmack | B01D 33/04 210/160 |
| 4,310,414 | A | * | 1/1982 | Lux | B01D 33/04 210/406 |
| 5,202,017 | A | * | 4/1993 | Hunter | B01D 33/807 210/86 |
| 5,624,579 | A | * | 4/1997 | Bratten | B01D 29/096 210/387 |
| 5,643,468 | A | * | 7/1997 | Ure | B01D 33/663 210/406 |
| 5,832,873 | A | * | 11/1998 | Tu | A01K 1/0146 119/447 |
| 5,921,399 | A | * | 7/1999 | Bakula | B01D 33/056 209/390 |
| 6,250,476 | B1 | * | 6/2001 | Kroon | B07B 1/55 209/390 |
| 6,357,576 | B1 | * | 3/2002 | Enomoto | B01D 21/2461 210/531 |
| 6,494,167 | B1 | * | 12/2002 | Chen | B01D 29/6484 119/447 |
| 6,695,122 | B2 | * | 2/2004 | Enomoto | B23Q 11/0057 210/531 |
| 6,899,807 | B2 | * | 5/2005 | Cummings | B01D 29/6476 210/531 |

(Continued)

*Primary Examiner* — Robert J Popovics
(74) *Attorney, Agent, or Firm* — Patent CEO LLC; Phillip Vales

(57) ABSTRACT

A liquid solid separator has a main container wherein a rotating filter belt receives influent for liquid sold mixture sieve processing. A filtered water collections tank, a pressurized water supply are sources of wash water inputs. Cold and hot water pressurized water supplies are also potential supply sources. Load balancing of inputs and single and dual wash water pumps are also described.

6 Claims, 5 Drawing Sheets

(56) References Cited

U.S. PATENT DOCUMENTS

| | | | | |
|---|---|---|---|---|
| 6,942,786 B1* | 9/2005 | Fosseng | B01D 33/056 | 210/393 |
| 8,302,780 B1* | 11/2012 | Mitchell | B01D 33/41 | 210/791 |
| 9,114,340 B2* | 8/2015 | Smith | B01D 33/04 | |
| 10,029,195 B2* | 7/2018 | Strain | B01D 33/804 | |
| 10,160,679 B2* | 12/2018 | Cote | C02F 3/1268 | |
| 10,688,420 B2* | 6/2020 | Strain | B01D 33/04 | |
| 10,786,766 B2* | 9/2020 | Strain | B01D 33/52 | |
| 11,213,772 B2* | 1/2022 | Mitchell | B01D 33/11 | |
| 11,389,754 B2* | 7/2022 | Santoro | B01D 33/806 | |
| 11,850,554 B2* | 12/2023 | Cote | C02F 1/004 | |
| 11,931,677 B2* | 3/2024 | Riedel | B01D 21/0084 | |
| 2003/0230520 A1* | 12/2003 | Cummings | B01D 29/6476 | 210/162 |
| 2011/0089122 A1* | 4/2011 | Smith | B01D 33/056 | 210/774 |
| 2013/0161270 A1* | 6/2013 | Stedman | B01D 33/0058 | 210/770 |
| 2013/0213904 A1* | 8/2013 | Mitchell | B01D 33/76 | 210/400 |
| 2015/0060341 A1* | 3/2015 | Mitchell | B01D 33/705 | 210/197 |
| 2015/0157965 A1* | 6/2015 | Strain | B01D 33/64 | 210/104 |
| 2015/0182889 A1* | 7/2015 | Strain | B01D 33/466 | 210/791 |
| 2016/0002083 A1* | 1/2016 | Cote | C02F 3/02 | 210/259 |
| 2017/0072345 A1* | 3/2017 | Syed | B01D 33/04 | |
| 2017/0088449 A1* | 3/2017 | Cote | C02F 1/004 | |
| 2017/0136393 A1* | 5/2017 | Strain | C02F 1/001 | |
| 2017/0189836 A1* | 7/2017 | Strain | B01D 29/096 | |
| 2018/0318736 A1* | 11/2018 | Santoro | C02F 1/008 | |
| 2018/0361281 A1* | 12/2018 | Bogardus | B65G 23/44 | |
| 2019/0135667 A1* | 5/2019 | Cote | C02F 3/1268 | |
| 2022/0080336 A1* | 3/2022 | Mitchell | B01D 33/04 | |
| 2022/0080338 A1* | 3/2022 | Mitchell | B01D 33/807 | |
| 2024/0091708 A1* | 3/2024 | Cote | C02F 1/004 | |

* cited by examiner

LIQUID SOLID SEPARATOR WASH WATER SUPPLY SYSTEM

CROSS REFERENCE TO RELATED APPLICATION

This application claims benefit of previously filed U.S. Non-Provisional patent application Ser. No. 14/470,794 entitled Liquid Solid Separator that was filed on 27 Aug. 2014, this patent application is hereby incorporated by reference in its entirety.

FIELD OF THE INVENTION

The invention herein described relates to devices for the separation of solids from liquids. More particularly, this invention relates to recirculation systems in rotating filter belt systems for cleaning of the rotating filter belt.

BACKGROUND OF THE INVENTION

General Prior Art Concept

Rotating Filters Belts (RFB) commonly use pressurized water to clean filter belts. Water used for washing the RFB is typically required to be particle free water so as to prevent the clogging of spray wash nozzles disposed near the RFB for cleaning the aforementioned. A problem with the use of 'wash water' or plant treated water is that wash water consumption can be significant for the cleaning of the RFB. This can become a significant operational cost for users sensitive to water usage. An additional issue for high flow water users, is a loss of water pressure during plant operation; this happens as different processes simultaneously require a limited water source resulting in the water pressure reduction because of high demand. Finally, for RFB that use water for belt washing, it is critical that a reliable source of wash water always be available.

Accordingly, there needs to be some solutions to overcome the aforementioned problems discussed above.

SUMMARY OF THE INVENTION

The present invention overcomes the deficiencies of the known art and the problems that remain unsolved by providing:

A liquid solid separator wash water supply system comprising:
 the liquid solid separator having an inlet;
 an outlet of the liquid solid separator;
 a drain line attached to the outlet and also attached to a tank;
 a tank first booster pump connected to the tank and also attached to a wash water system of the liquid solid separator through a first pipe line;
 a level transmitter associated with the tank and in electronic communication with a controller also associated with the tank.
In another aspect, further comprising:
a back flow restriction valve associated with the first pipe line.
In another aspect, further comprising:
a second pipe line having a connection to the first pipeline after the back flow restriction valve but before the wash water supply system.
In another aspect, further comprising:
a first pressure transmitter located on the first pipe line after a connection from a second pipe line.
In another aspect, further comprising:
a second pressure transmitter located on the second pipe line before the second pipe line attaches to and feeds the first pipe;
wherein the second pressure transmitter is also located on the second pipe line before a pressurized water isolation valve is attached to the second pipe line.
In another aspect, further comprising:
a second wash system booster pump attached to the first pipe line after the connection from the second pipe line but before the wash water system of the liquid solid separator.
In another aspect, further comprising:
wherein the second booster pump boosts water from a pressurized water source or from the screened water tank and the tank first booster pump.
In another aspect, further comprising:
a second booster pump located in series with the tank first booster pump wherein the second booster pump is located on the first pipe line after the first booster pump but before the wash water system of the liquid solid separator.
In another aspect, further comprising:
a pressurized water booster pump located on the second pipe line before the pressurized water isolation valve is attached to the second pipe line.

A liquid solid separator wash water supply system comprising:
 the liquid solid separator having an inlet;
 an outlet of the liquid solid separator;
 a drain line attached to the outlet and also attached to a tank;
 a tank first booster pump connected to the tank and also attached to a wash water system of the liquid solid separator through a first pipe line;
 wherein the tank first booster pump is connected to the tank through a tank isolation valve;
 a level transmitter associated with the tank and in electronic communication with a controller also associated with the tank.
In another aspect, further comprising:
a wash strainer pressure transmitter located on the first pipe line after the wash system booster pump but before a wash water strainer also located on the first pipe line.
In another aspect, further comprising:
a second pipeline attached between the tank first booster pump and the tank isolation valve.
In another aspect, further comprising:
a first feed pipe line runs from a cold water pressurized source into the second pipe line.
In another aspect, further comprising:
a second feed pipe line runs from a hot water pressurized source into the second pipe line.
In another aspect, further comprising:
a cold water pressure transmitter is located on the first feed pipe line before cold pressurized water reaches a pressurized water isolation valve;
a hot water pressure transmitter is located on the second feed pipe line before hot pressurized water reaches a pressurized hot water isolation valve.
In another aspect, further comprising:
a wash water pressure transmitter located on the first pipe line after the wash water strainer.

A liquid solid separator wash water supply system comprising:
 the liquid solid separator having an inlet;
 an outlet of the liquid solid separator;

a connecting line attached to the outlet and also attached to an effluent break tank;

a tank first booster pump connected to the tank and also attached to a wash water system of the liquid solid separator through a first pipe line;

wherein the tank first booster pump is connected to the tank through a tank isolation valve;

a level transmitter associated with the tank and in electronic communication with a controller also associated with the tank.

In another aspect, further comprising:

an alternative outlet disposed on the effluent break tank.

In another aspect, further comprising:

a wash water strainer also located on the first pipe line after the tank first booster pump;

a back flush valve located on the wash water strainer which is attached to a subsidiary pipe line attached to the wash water strainer: wherein the subsidiary pipe line directs back flush to the liquid solid separator.

In another aspect, further comprising:

a second pipeline attached between the tank first booster pump and the tank isolation valve;

a first feed pipe line runs from a cold water pressurized source into the second pipe line;

a second feed pipe line runs from a hot water pressurized source into the second pipe line;

a cold water pressure transmitter is located on the first feed pipe line before cold pressurized water reaches a pressurized water isolation valve;

a hot water pressure transmitter is located on the second feed pipe line before hot pressurized water reaches a pressurized hot water isolation valve.

These and other aspects, features, and advantages of the present invention will become more readily apparent from the attached drawings and the following detailed description of the preferred embodiments.

BRIEF DESCRIPTION OF THE DRAWINGS

The preferred embodiments of the invention will hereinafter be described in conjunction with the appended drawings provided to illustrate and not to limit the invention, in which.

Like reference numerals refer to like parts throughout the several views of the drawings.

DETAILED DESCRIPTION

Figure 1:
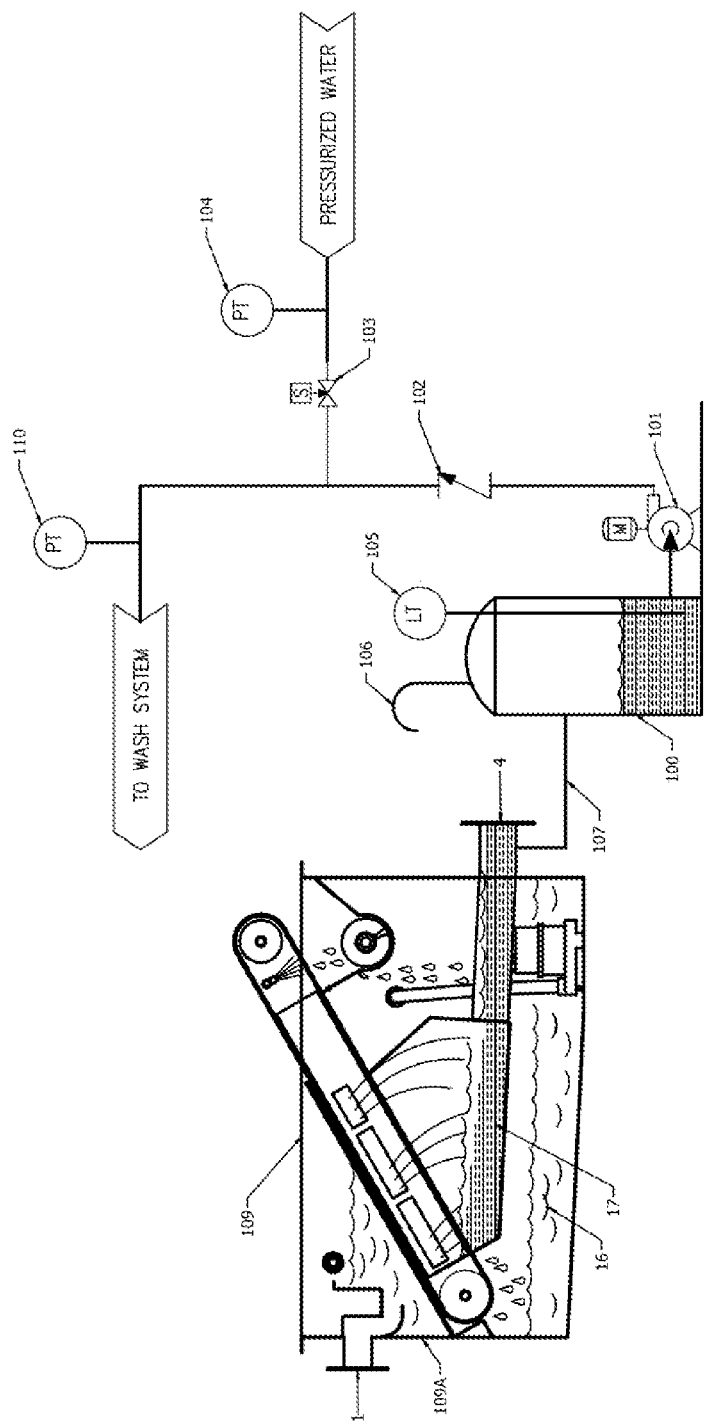
FIG. 1 presents a Liquid Solid Separator Wash Water Supply System in a first embodiment disclosed herein.

The following detailed description is merely exemplary in nature and is not intended to limit the described embodiments or the application and uses of the described embodiments. As used herein, the word exemplary or illustrative means serving as an example, instance, or illustration. Any implementation described herein as exemplary or illustrative is not necessarily to be construed as preferred or advantageous over other implementations. All of the implementations described below are exemplary implementations provided to enable persons skilled in the art to make or use the embodiments of the disclosure and are not intended to limit the scope of the disclosure, which is defined by the claims. For purposes of description herein, the terms upper, lower, left, rear, right, front, vertical, horizontal, and derivatives thereof shall relate to the invention as oriented in each figure.

Furthermore, there is no intention to be bound by any expressed or implied theory presented in the preceding technical field, background, brief summary or the following detailed description. It is also to be understood that the specific devices and processes illustrated in the attached drawings, and described in the following specification, are simply exemplary embodiments of the inventive concepts defined in the appended claims. Hence, specific dimensions and other physical characteristics relating to the embodiments disclosed herein are not to be considered as limiting, unless the claims expressly state otherwise.

The system uses a Human Machine Interface (HMI) which is typically a touch screen computer interface mounted on a control panel; alternatively, or in combination with the foregoing, the system could use any type of HMI, such as a series of buttons on a panel, remote computer, cell phone, tablet or other type of HMI. The system typically has all automated valves; however, they are capable of being manually turned ON and OFF via the HMI. Thus, each valve has three states, and these are namely, ON, OFF and AUTO where the AUTO state is the default.

The HMI is capable of communicating with a programmable logic controller mounted in a convenient module or station that directs the activity of various system component. Thus, a user can program or modify various system SET POINTS for the PLC through the HMI that coordinates or defines operation conditions and or parameters. Some examples of SET POINTS found in the system include:

Desired Wash Pressure (psi)—The desired wash pressure is used by the PLC to transmit signals through a control loop, line, WiFi, wireless, wired to the pump speed control which has a variable frequency drive that varies the hertz of the incoming power to the pump. This function is controlled solely by the feedback from a pressure transmitter PT 110 that is down stream of the booster pump sending signals to the PLC in order to inform it of the current pressure state.

High Wash Pressure (psi)—triggers an alarm to notify the operator that the wash pressure is running higher than it is supposed to, but the system continues to run.

High High Wash Pressure (psi)—shuts down the system because the pressure is unacceptably high.

Low Wash Pressure (psi)—triggers an alarm to notify the operator that the wash pressure is running lower than it is supposed to, but the system continues to run.

Low Low Wash Pressure (psi)—shuts down the system because the pressure is unacceptably low.

Hot Water Wash, Frequency and Duration—The system is capable of running hot water to remove oil and grease from the sieve belt. The user sets the frequency and how long the wash lasts. This occurs during normal operation, i.e., the system continues to filter raw water but switches to hot water for a set time. Usually hot water washes occur every hour for about 1-2 minutes. It is very effective to remove grease that will blind the belt and will not wash off with cold water.

Optional Monitoring of Hot Water Temp—The system can monitor hot water temperature using a temperature sensor communicating with the PLC through wired or wireless communication. The sensor is attached to a hose, pipe or other conduit of the system; the sensor has a source of power either independent such as battery supply, or through a wired or inductive connection to a source of power.

Primary Wash Source—Can either be screened water or auxiliary water (pressurized water from an external source like city water).

Screened Water Tank Low Level (in)—feedback from the tank level transmitter LT 105. If the liquid level falls below this level the screened water (liquid) is deemed unavailable.

Auxiliary Water Low Pressure (psi)—feedback from the PT 104 prior to the valve. When the pressure drops below this pressure, the PLC deems there to be insufficient pressure for the auxiliary to be used.

Automation Logic: If the Primary source is set to screened water, valve 103 (and 116 FIG. 4-5) is shut and the wash water is drawn from the tank. If the tank falls below the Screened water tank low level then valve 103 is opened (and or 116) and the wash source is switched to the secondary wash source. If the overall pressure is below the Low Low pressure then the entire system shuts down.

If the primary source is set to auxiliary water, then valve 103 (and or 116) is opened. If the overall pressure is below the Low Low pressure then valve 103 is shut and the system switches to tank water. If the tank is below the screened water tank low level then the entire system shuts down. If and when the entire system shuts down for low low pressure condition, valve 103 shuts regardless of conditions. Regardless of the primary wash source setting, the PLC will continue to monitor the pressurized water pressure and the tank level. Once either source becomes active, either pressure is restored or water level comes back to the tank, the system automatically starts back up.

FIG. 1 presents a Liquid Solid Separator Recycling System in a first embodiment disclosed herein. A liquid solid separator 109A receives raw unscreened water at inlet 1 for processing by a rotating filter belt 109. Filtered water 17 are collected and sent out through an outlet 4. A screened water drain line 107 is a pipe typically welded to a portion of the outlet 4. The screened water drain line 107 is also welded or otherwise attached to a screened water tank 100. The screened water tank 100 has an atmospheric tank vent 106 at top that is open to the atmosphere to maintain atmospheric pressure. A level transmitter 105 located within the screened water tank 100 provides by wired or wireless communication the current level of the screened water tank 100 to a programmable logic controller PLC (not shown) associated with the liquid solid separator.

A tank booster pump 101 is controlled electronically by a signal from the liquid solid separator PLC to provide filtered water from the screened water tank 100 to the wash system of the liquid solid separator upon demand thereof. When the tank booster pump 101 is given the command to pump more water then water is transported through a pipe connecting the screened water tank 100 and the tank booster pump 101. The tank booster pump 101 moves this water down a first pipe line connecting a tank booster pump 101 exit to the wash system of the liquid solid separator. A check valve 102 or more generally a back flow restriction valve is inserted within this first pipe line so as to prevent back flow to the tank booster pump 101 and is located before the connection from the second pipe line.

A first pressure transmitter 110 located on a first pipe line after a connection from a second pipe line is utilized to determine overall system pressure. The first pressure transmitter 110 is attached to the first pipe line after the check valve 102 and after the connection of the second pipe line. A second pressure transmitter 104 is located on a second pipe line before pressurized water reaches a pressurized water isolation valve 103 and is used to determine if pressurized water is available. This pressurized water isolation valve 103 is also located on the second pipe line before the second pipe line attaches to and feeds the first pipe line.

In order to determine the source of wash water for the wash system of the liquid solid separator, a PLC associated therewith receives signals (wired, wireless) from the level transmitter device 105 and pressure transmitters 104, 110. When there is a need for liquids and the screened water tank 100 has sufficient liquids for this task as signaled from the level transmitter 105, then the PLC electronically transmits (wired or wirelessly) a command to the tank booster pump 101 to activate sending screened water through the first pipe line and ultimately to the wash system of the liquid solid separator. However, if there is not enough liquids in the filtered liquids collections tank 100, then the PLC checks to see if there a reliable source of pressurized water by received signals from the pressure transmitter 104 on the second pipe line. If there is, then the PLC transmits a command (wirelessly or wired) to pressurized water isolation valve 103 to open the pressurized water isolation valve 103 thereby transporting pressurized water to the wash system.

However, in the event of need for water for the liquid solid separator wash system, if both of the pressurized transmitter for pressurized water 104 and the pressure transmitter for wash water 110 are signaling that there is not enough pressure at their respective locations then the PLC signals the pressurized water isolation valve 103 to CLOSE and the tank booster pump 101 to stop thereby stopping the flow of water. At this point, the system is down for maintenance.

Figure 2:
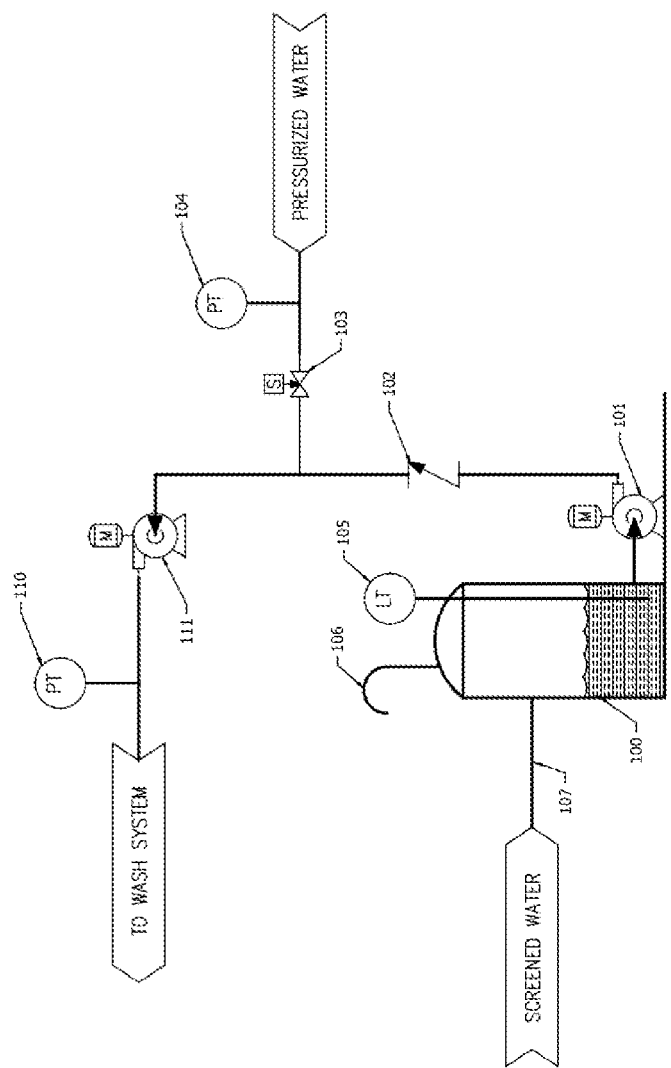
FIG. 2 presents a Liquid Solid Separator Wash Water Supply System in a second embodiment disclosed herein having a second booster pump in series.

FIG. 2 presents a Liquid Solid Separator Wash Water Supply System in a second embodiment disclosed herein having a second pump called the wash system booster pump 111; this is inserted in the first pipe line after the connection from the second pipe line but before arriving at the wash system of the liquid solid separator. In this embodiment, a wash system booster pump 111 is located in series with the first tank booster pump 101. A check valve 102 or more generally a back flow restriction valve is inserted within the first pipe line so as to prevent back flow to the tank booster pump 101 and is located before the connection from the second pipe line.

In this embodiment, the wash system booster pump 111 is able to boost either pressurized water or water boosted from the screened water tank 100 and its tank booster pump 101. Here wash system booster pump 111 is normally part of a control loop that uses a signal from wash water pressure transmitter 110 to adjust pump speed which adjusts pump pressure so that the desired wash pressure can be achieved through automation. Typically, wash water pressure transmitter 110 sends a signal to a PLC (not shown) that determines if there is a pressure adjustment necessary on that first pipe line. If it is necessary then the PLC commands the wash system booster pump 111 through wireless or wired communication to adjust pump speed UP or DOWN as needed.

As a result, the wash system booster pump 111 adjusts its speed UP or DOWN as has been commanded by the PLC. The checking of the wash water pressure transmitter 110 signals is a continual process until the system is shutdown for maintenance or a failure occurs.

Figure 3:
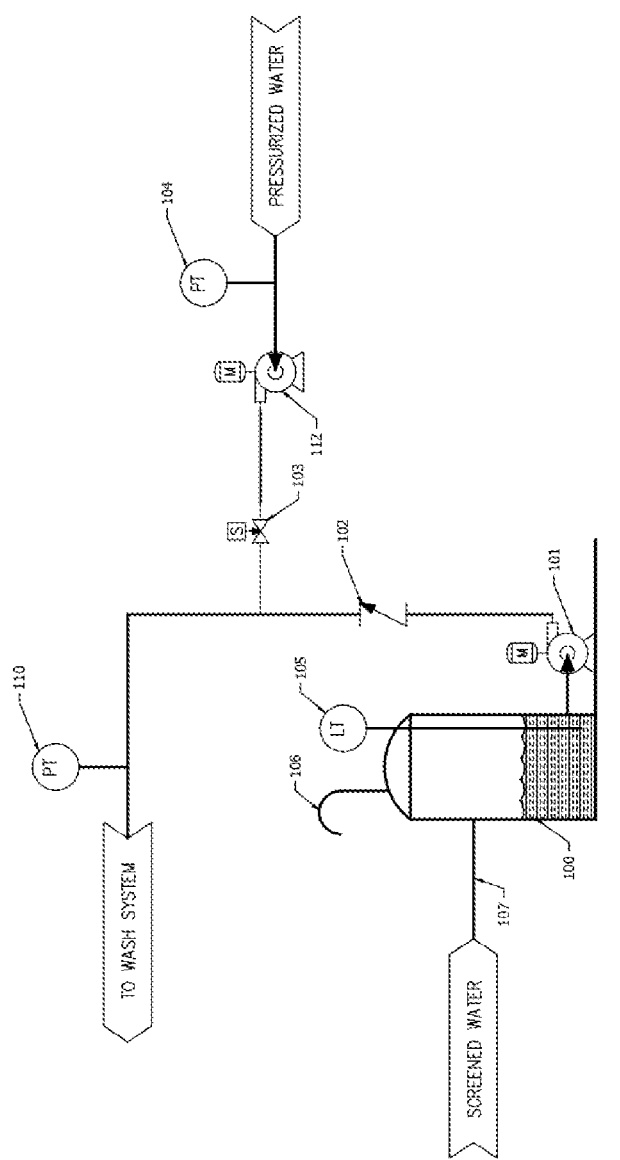
FIG. 3 presents a Liquid Solid Separator Wash Water Supply System in a third embodiment disclosed herein having its second booster pump on the second pipe line from the external pressurized water source instead of where it was in FIG. 2.

FIG. 3 presents a Liquid Solid Separator Wash Water Supply System in a third embodiment disclosed herein has its second booster pump on the second pipe line from the external pressurized water source instead of where it was in FIG. 2. This embodiment is the same as that of FIG. 2, however, the pressurized water booster pump 112 would be located on the second pipe line before the automated valve 103 so that pressurized water can be selectively provided to the system as needed based upon the operation of the automated valve 103 controlled by the PLC (not shown).

Here the tank booster pump 101 and the pressurized water booster pump 112 are in a control loop; alternatively, the pumps would be sized for just one speed. In this embodiment it would possible to achieve proper pressure without a control loop.

Figure 4:
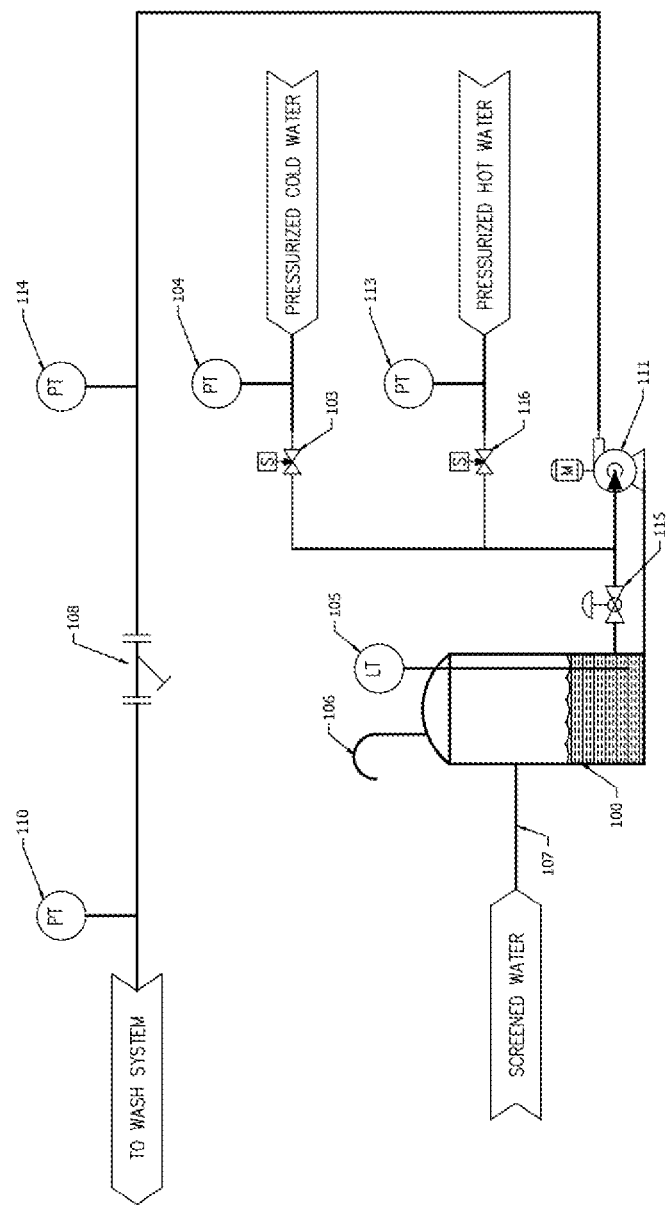
FIG. 4 presents a Liquid Solid Separator Wash Water Supply System having cold and hot water supplies in a fourth embodiment disclosed herein.

FIG. 4 presents a Liquid Solid Separator Wash Water Supply System having cold and hot water supplies in a fourth embodiment disclosed herein. Here a first pipe line runs from the screened water tank 100 to the wash system of the liquid solid separator (shown in FIG. 1). A tank isolation valve 115 is placed on this first pipe line and is a motorized valve controlled by the PLC for release of fluids to the wash system. A motorized valve is used instead of a check valve as some screened water in screened water tank 101 may have some particles; this because whilst a sieve or filter belt removes most particles, some might remain and even form larger agglomerations causing problems in the system. A wash system booster pump 111 is also on the first pipe line after the tank isolation valve 115 to boost the pressure as needed from the screened water tank 100 or from the other sources of liquids.

A wash strainer pressure transmitter 114 is located on the first pipe line after the wash system booster pump 111 but before a wash water strainer 108 also located on the first pipe line. After the wash water strainer 108 there is the wash water pressure transmitter 110 also located on the first pipe line. It is advantageous to introduce the wash water strainer 108 as this adds redundant protection of wash nozzles which can become clogged when particles are present in water.

A second pipeline runs feeds into the first pipeline after the tank isolation valve 115 but before a wash system booster pump 111. This second pipe line is fed from two sources a pressurized cold water source and a pressurized hot water source. A first feed pipe line runs from a cold water pressurized source into the second pipe line. A cold water pressure transmitter 104 is located on a first feed pipe line before pressurized water reaches a pressurized water isolation valve 103 and is used to determine if pressurized water is available. This pressurized water isolation valve 103 is also located on the first feed pipe line and attached to the second pipe line which in turn attaches to and feeds the first pipe line.

A second feed pipe line runs from the hot water pressurized source into the second pipe line. A hot water pressure transmitter 113 is located on a second feed pipe line before hot pressurized water reaches a pressurized hot water isolation valve 116 and is used to determine if hot pressurized water is available. This pressurized hot water isolation valve 116 is also located on the second feed pipe line that in turn is attached to the second pipe line which in turn attaches to and feeds the first pipe line. When the PLC determines through user defined terms that a hot water wash is necessary to clean the system, it transmits a signal to hot water isolation valve 116 to open and another signal to pressurized water isolation valve 103 to close thereby solely feeding hot water to the wash system of the liquid solid separator. At the end of a cleaning cycle, which is timed or determined by pressure drops between a wash strainer pressure transmitter 114 and wash water pressure transmitter 110, the PLC commands the hot water isolation valve 116 to close and another signal to pressurized water isolation valve 103 to open thereby continuing normal operation.

Figure 5:
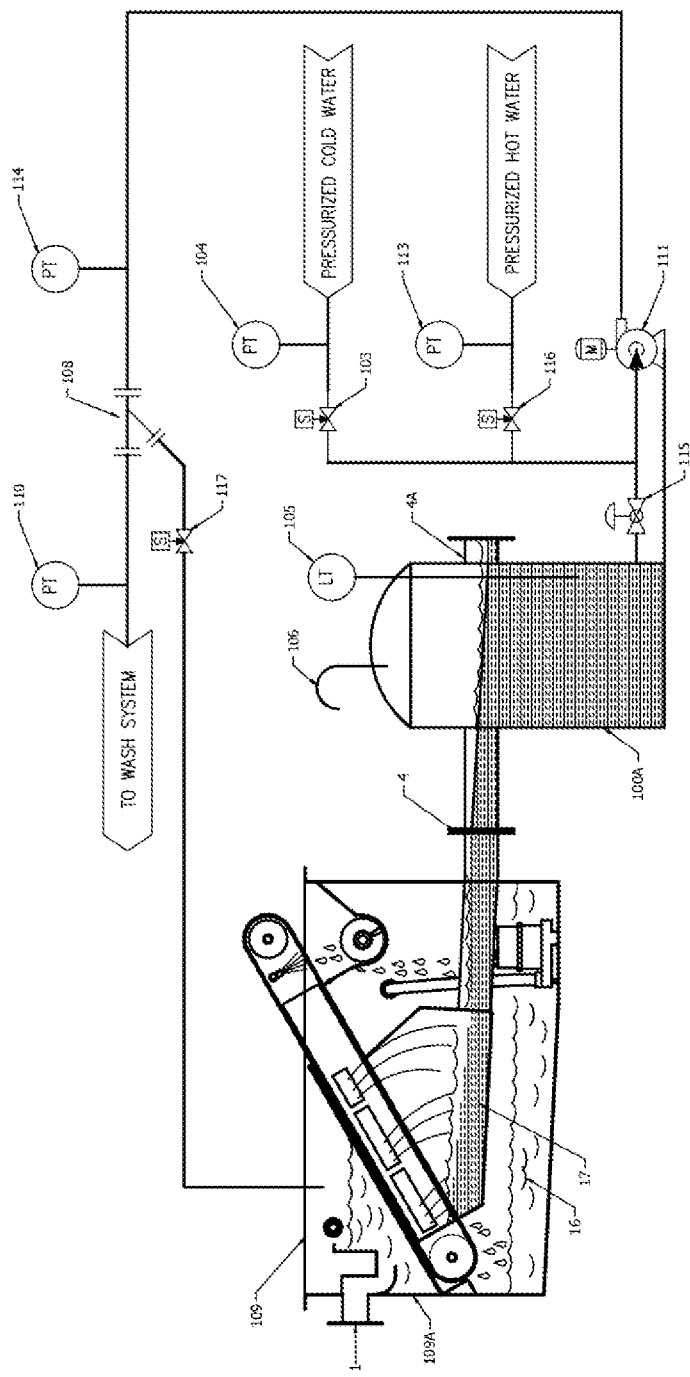
FIG. 5 presents a Liquid Solid Separator Wash Water Supply System having cold and hot water supplies and a supply to the influent basin of a Liquid Solid Separator in a fifth embodiment disclosed herein.

FIG. 5 presents a Liquid Solid Separator Wash Water Supply System having cold and hot water supplies and a supply to the influent basin of a Liquid Solid Separator in a fifth embodiment disclosed herein. Here the system is the same as that in FIG. 4 except for the following changes. The filtered water 17 is collected and sent out through an outlet 4 of the liquid solid separator. The outlet 4 has a connecting pipe attached at one end (welded, bolted-screw or thread to thread) to an effluent break tank 100A instead of screened water tank 100; whilst screened water is still arriving the nomenclature and enumeration changes as the disposition of elements has been modified. This connecting pipe has a second flanged end that is attached (welded, bolted-screw or thread to thread) to a flanged end of the liquid solid separator outlet 4. The effluent break tank 100A has its own alternative outlet 4A which is shown in figure as a pipe having one end attached to a side of the effluent break tank 100A and the other end open to another piping system or tank (not shown).

The other change to this embodiment involves introduction of a back flush valve 117. This back flush valve is located on a subsidiary pipe line attached to the wash water strainer 108; this subsidiary pipe line directs back flush to the rotating filter belt 109 liquid solid separator. The back flush valve 117 is controlled by the PLC (not shown) and opens to feed water from the wash water strainer 108 when it needs to be further processed. A wash strainer pressure transmitter 114 is located on the first pipe line after the wash system booster pump 111 but before a wash water strainer 108 also located on the first pipe line.

The PLC is receiving signals from both pressure wash water pressure transmitter 110 located after the wash water strainer 108 in the first pipe line; and from a wash strainer pressure transmitter 114 also located on the first pipe line after the wash system booster pump 111 but before a wash water strainer 108. This happens as a result of wash water pressure transmitter 110 and wash strainer pressure transmitter 114 detecting sufficient pressure drop as a difference between from the latter transmitter to the former transmitter indicating that the water in the strainer needs to be further processed. This fact is transmitted to the PLC to open the back flush valve 117. When the pressure variance between the wash water pressure transmitter 110 and wash strainer pressure transmitter 114 returns to a normal operating level then this fact is communicated to the PLC and the back flush valve 117 is closed as the water at wash water strainer 108 does not need to be further processed by the liquid solid separator.

The above-described embodiments are merely exemplary illustrations of implementations set forth for a clear understanding of the principles of the invention. Many variations, combinations, modifications or equivalents may be substituted for elements thereof without departing from the scope of the invention. Therefore, it is intended that the invention not be limited to the particular embodiments disclosed as the best mode contemplated for carrying out this invention, but that the invention will include all the embodiments falling within the scope of the appended claims.

What is claimed is:

1. A rotating filter belt system comprising:
a tank having a screened water outlet (4);
an endless, inclined, rotating filter belt disposed in the tank, dividing the tank into an upstream unfiltered volume and a downstream screened water volume;
a wash system for directing water at the rotating filter belt to wash the rotating filter belt;
a screened water drain line (107) in fluid communication with the screened water outlet (4) for receiving screened water;
a screened water tank (100) in fluid communication with the screened water drain line (107) for collecting screened water;
a recirculation line fluidically connected to an outlet of the screened water tank (100) and in fluid communication with the wash system for supplying water to the wash system;
a booster pump disposed in the recirculation line;
a source of pressurized water is fluidically connected to the recirculation line;
a temperature sensor attached to a conduit; and
a control system for selectively supplying water to the wash system from either the screened water tank (100) or the source of pressurized water, based on the quantity of water present in the screened water tank (100).

2. The rotating filter belt system of claim 1, further comprising:
a level transmitter (105) located within the screened water tank (100) to provide, by wired or wireless communication, the current level of the screened water in the screened water tank (100) to the control system.

3. The rotating filter belt system of claim 1, further comprising:
a second booster pump in association with the recirculation line or with the source of pressurized water.

4. The rotating filter belt system of claim 1, further comprising:
at least one pressure transmitter (PT) (110) in operable communication with the control system, in order to communicate the pressure at one or more points of the rotating filter belt system.

5. The rotating filter belt system of claim 1, wherein the source of pressurized water that is fluidically connected to the recirculation line includes separate sources of hot and cold water.

6. The rotating filter belt system of claim 1, wherein the recirculation line includes a branch capable of delivering water into the upstream unfiltered volume.

* * * * *